United States Patent Office 3,660,339
Patented May 2, 1972

3,660,339
LATEX THICKENER
Theodore R. Schuh, Jr., North Riverside, Ill., assignor to Nalco Chemical Company, Chicago, Ill.
No Drawing. Filed June 3, 1969, Ser. No. 830,098
Int. Cl. C08d 7/14
U.S. Cl. 260—29.7 D                                           3 Claims

ABSTRACT OF THE DISCLOSURE

A latex composition comprising a colloidal aqueous emulsion of a polymer and 0.1–5% by weight, based on dry latex, of a thickening agent.

The thickening agent is prepared by reacting a maleic anhydride copolymer with a polyalkylene glycol in a mole ratio of .001:1 to 0.1:1.

INTRODUCTION

Whatever a latex, alternatively referred to as a polymer emulsion or dispersion, is used as such, it is almost sure to be modified by formulation. The control of flow properties is one of the most important objectives of the process of formulation. Because these emulsions are characteristically very fluid, increased viscosity is usually sought by the addition of "latex thickeners." As a result, the entire subject of the control of flow properties is often referred to under the general term "latex thickening." Because of the increasing utilization of polymer emulsions, the problem of latex thickening is one of great industrial importance.

Water-soluble polymers are the most commonly used latex thickeners. With any given water-soluble polymer, thickening of the latex is generally increased with increased molecular weight of the polymer. However, very low molecular weight polymers, which have a relatively small thickening effect in water, may be extremely effective in thickening certain latexes.

The variability of thickening action is typical and may be attributed to the various latex compositions, particularly the nature of the emulsifiers. The phenomenon is made even more complex when compounded latex formulations in which the thickener may also react with clay, pigment, and fillers introduced into the system.

In handling certain rubber latexes, especially natural rubber, a convenient practice is to cream the latex in order to concentrate the rubber. The addition of such a creaming agent as a low molecular weight thickening agent to a 40% natural rubber latex will result in the separation into a clear serum layer and a more concentrated, approximately 60% latex layer.

In textile applications, the thickening of latexes is required in the backing of rugs for the preparation of resilient, rubberized, non-slip floor coverings. It is also necessary to thicken a latex used as an adhesive for applying a jute backing to a rug. The purpose of thickening the latex formulation is to prevent "strike-thru" of the adhesive into the rug pile. It is also used in upholstery fabric backing. Thickened latexes are also required for dipping operations in which fabric forms may be dipped in thickened rubber latex and the covered form cured to prepare such articles as gloves.

The latex paint field is a rapidly expanding one. The adjustment of such paint to a desired viscosity level is required for brushing and roller and spray application. Viscosity adjustment can be made with thickening agents. In addition, the final formulation must be stable. Both formulation and stability in reduction of viscosity drift of the thickened paint are required of the thickeners used.

They also serve as a grinding media for the preparation of paint pastes.

The thickening agent composition taught by this invention satisfies all of the requirements recited in the above applications. However, the thickening agent composition of this invention has the added benefit of producing greater thickening results than currently existing thickening additives.

OBJECTS

It is an object of this invention to provide a superior and versatile latex thickening agent.

It is another object to teach a thickening agent composition which can be used to control the viscosity in latex systems.

Further objects will appear hereinafter.

INVENTION

General statement of invention

The latex composition of this invention comprises a colloidal aqueous emulsion of a polymer and 0.1–5% by weight, based on dry rubber of a polymeric thickening agent.

The thickening agent is prepared by reacting a maleic anhydride copolymer with a polyalkylene glycol having a molecular weight of 200–50,000. The mole ratio of the polyalkylene glycol to the maleic anhydride copolymer is .001–0.1.

The maleic anhydride copolymer is produced by polymerizing about equimolar proportions of a maleic anhydride compound and an ethylenically unsaturated monomer. Copolymers of maleic anhydride wherein the other monomer is present in amounts greater than 50 mole percent have also shown usefulness in this area.

Latex system

A latex system may be very generally defined to be a polymer emulsion or a polymer dispersion in water.

Maleic anhydride

The term "maleic anhydride" identifies anhydrides having the formula:

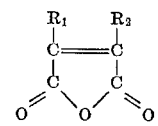

in which $R_1$ and $R_2$ are radicals selected from the group consisting of hydrogen, alkyl, aryl and alkylaryl containing up to 8 carbon atoms, and halogen.

Ethylenically unsaturated monomers

The ethylenically unsaturated monomers are those capable of reacting with the maleic anhydride compound as given above.

Such monomers may be represented by the general formula:

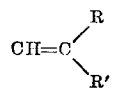

where R is a radical selected from the group consisting of hydrogen, halogen, alkyl, cycloalkyl, aryl, alkaryl and aralkyl, and R' is a radical selected from the group consisting of aryl, alkyl ether radicals, alkaryl and radicals represented by the formulas:

(a)    $-C \equiv N$ (b)  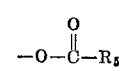

(c) 
$$-\overset{O}{\underset{\|}{C}}-OR_6$$

(d) 
$$-\overset{O}{\underset{\|}{C}}-R_7$$

(e) 
$$-\overset{O}{\underset{\|}{C}}-N\overset{R_8}{\underset{R_9}{}}$$

(f) $-OR_{10}$ where $R_5$, $R_6$ and $R_7$ each represents a radical selected from the class consisting of alkyl, cycloalkyl, aryl and alkoxyalkyl radicals, $R_8$ and $R_9$ each represents a member of the class consisting of hydrogen, and alkyl, cycloalkyl, aryl, alkaryl, aralkyl, and alkoxyalkyl radicals, and $R_{10}$ has the same meaning as $R_5$ and $R_6$.

In a preferred embodiment of this invention the ethylenically unsaturated monomers are those where R is hydrogen and R' is a radical selected from the group consisting of alkanol ether radicals, acetate, methyl, ethyl, propyl, isopropyl, styrene radicals and carboxyl.

The most preferred ethylenically unsaturated monomer is vinyl acetate.

Preparation of maleic anhydride copolymer

A maleic anhydride compound as defined above is reacted with one of the defined ethylenically unsaturated monomers. At least 20 mole percent of the reaction mixture should be maleic anhydride. The preferred mole percent of maleic anhydride compound should be about 50%.

The reaction is conveniently conducted in a catalyzed hydrocarbon solvent system for a period of 1–5 hours at a temperature of 65–80° C. The resulting copolymer has the following structural formula:

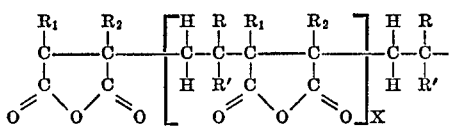

where (a) R is a radical selected from the group consisting of hydrogen, halogen, alkyl, cycloalkyl, aryl, alkaryl and aralkyl, (b) R' is a radical selected from the group consisting of aryl, alkyl ether radicals, alkaryl and radicals represented by the formulas:

(1) $-C\equiv N$ (2) 
$$-O-\overset{O}{\underset{\|}{C}}-R_5$$

(3) 
$$-\overset{O}{\underset{\|}{C}}-OR_6$$

(4) 
$$-\overset{O}{\underset{\|}{C}}-R_7$$

(5) 
$$-\overset{O}{\underset{\|}{C}}-N\overset{R_8}{\underset{R_9}{}}$$

(6) $-OR_{10}$ where $R_5$, $R_6$ and $R_7$ each represents a radical selected from the class consisting of alkyl, cycloalkyl, aryl and alkoxyalkyl radicals, $R_8$ and $R_9$ each represents a member of the class consisting of hydrogen, and alkyl, cycloalkyl, aryl, alkaryl, aralkyl, and alkoxyalkyl radicals, and $R_{10}$ has the same meaning as $R_5$ and $R_6$, (c) $R_1$ and $R_2$ are radicals selected from the group consisting of hydrogen, alkyl, aryl and aralkyl containing up to 8 carbon atoms and halogen, and (d) X is an integer.

The molecular weight of the maleic anhydride copolymer is 10,000–80,000 and preferably 20,000–30,000.

The hydrocarbon solvent of the polymerizable system comprises a water-insoluble organic heat transfer medium. This medium may be any liquid organic compound which is substantially insoluble in water. Preferably, this medium should be capable of forming an azeotropic mixture with water. Especially preferred are benzene, toluene, xylene, ethylene dichloride, carbon tetrachloride, tetrachloroethylene, heptane, hexane, mixed paraffinic fractions and mixtures thereof.

The catalysts that may be employed in this invention include any of the conventional polymerization catalysts normally used with the particular monomer being employed. Some conventional peroxidic oxidizing agents such as benzoyl peroxide, lauroyl peroxide and other peroxides and hydroperoxides such as t-butyl hydroperoxide and cumene hydroperoxide may be used. Peresters such as t-butyl perbenzoate are also effective. Alternatively, azo-type catalysts such as those described in U.S. Pat. 2,471,959 may effectively be employed. Also, organic redox systems may be used, e.g., 1-ascorbic acid and t-butyl perbenzoate. The amount of catalysts used may vary widely from about 0.03% to about 3.0% by weight, based on the weight of the monomer or monomers. A more preferred range is from about 0.10% to about 0.80% by weight.

Polyalkylene glycols

The polyalkylene glycols used to prepare the polymeric thickening agents are represented by the following structural formula:

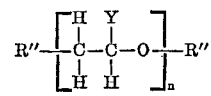

where (a) Y is selected from the group consisting of H, $-CH_3$ and $-C_2H_5$;

(b) R" is selected from the group consisting of $-OH$, $-NH_2$, $-CONH_2$, $-SH$, $-CH_3O$ and $-C_2H_5O$ with the additional proviso that there can be only one occurrence of R" selected from the group consisting of $-CH_3O$ and $-C_2H_5O$; and (c) $n$ is a whole integer.

The preferred polyalkylene glycols are polyethylene glycols and polypropylene glycol. The most preferred polyalkylene glycols are polyethylene glycols.

The polyalkylene glycol used must have a molecular weight of 200–50,000 and preferably 2,000–6,000, and must be water-soluble.

Preparation of thickening agent

The thickening agent taught by this invention is prepared by reacting the maleic anhydride copolymer with the polyalkylene glycol. The mole ratio of polyalkylene glycol to maleic anhydride copolymer is within the range .001–0.1. The reaction may take place by adding the polyalkylene glycol directly to the reaction system used to produce the maleic anhydride copolymer. After this addition the new reaction system is heated for a reaction time of 2–6 hours at a reaction temperature of 60–80° C.

The resulting polymeric thickening agent can be recovered by several methods including filtration, centrifugation, sedimentation, etc. The thickening agent may be altered structurally before recovery. However, such alteration should be considered equivalent to the original polymeric thickening agent as formed.

Some possible recovery adducts are:

(a) the original product in the anhydride form;

(b) that produced by reacting the original product with anhydrous ammonia to give the amide-ammonium salt;

(c) that produced by neutralizing the original product with alkali metal bases or salts;
(d) that produced by hydrolyzing the original product to its diacid form; or
(e) that product produced by reaction with organic bases.

Method of using thickening agent

The latex thickening agent composition is added to a latex system. The amount of thickening agent composition added is 0.1–5% by weight based on dry latex and and more preferably 0.25–2.5% by weight.

EXAMPLES

The invention will be illustrated by the following examples. These examples should serve illustrative purposes only and are not intended to be restrictive in any way.

EXAMPLE I

Ninety-eight grams of maleic anhydride and 89 grams of vinyl acetate were added to a reaction vessel. Five hundred grams of benzene (solvent) was then added to this combination. A benzoyl peroxide catalyst in amounts of 0.8 gram was then added to the reaction system. The reaction system was then subjected to a temperature of 70±2° C. for a 3 hour period. The maleic anhydride vinyl acetate copolymer was formed. Subsequent to the 3 hour reaction period, 20 grams of a polyethylene glycol having a molecular weight of 4,000 and dissolved in 50 grams of benzene was added to the reaction vessel containing the produced copolymer product. This new reaction mixture was heated to 70° C. for a period of 4 hours. The resulting product was the thickening agent of this invention.

The final product was then dried to form a powder.

EXAMPLE II

Anhydrous $NH_3$ was bubbled into the resulting reaction product of Example I to form the amide/ammonium salt. The product was recovered as a dry powder which was readily soluble in water.

EXAMPLE III

A latex composition comprising 200 grams (wet basis) of a carboxylated SBR latex (styrene-budadiene rubber), 300 grams of calcium carbonate ($CaCO_3$) and 70 grams of water were added to a beaker. One gram of the latex thickener formed in Example I was added to the latex composition. The resulting system viscosity was 18,000 cps. The viscosity prior to thickener addition was less than 200 cps.

EXAMPLE IV

Ninety-eight grams of maleic anhydride and 89 grams of vinyl acetate were added to a reaction vessel. Five hundred grams of benzene (solvent) was then added to this combination. A benzoyl peroxide catalyst in amounts of 0.8 gram was then added to the reaction system. The reaction system was then subjected to a temperature of 70±2° C. for a 3 hour period. The maleic anhydride vinyl acetate copolymer was formed. Subsequent to the 3 hour reaction period, 20 grams of a polyethylene glycol amine having a molecular weight of 2,000 and dissolved in 50 grams of benzene was added to the reaction vessel containing the produced copolymer product. This new reaction mixture was heated to 70° C. for a period of 4 hours. The resulting product was the thickening agent of this invention.

EXAMPLE V

Ninety-eight grams of maleic anhydride and 89 grams of vinyl acetate were added to a reaction vessel. Five hundred grams of benzene (solvent) was then added to this combination. A benzoyl peroxide catalyst in amounts of 0.8 gram was then added to the reaction system. The reaction system was then subjected to a temperature of 70±2° C. for a 3 hour period. The maleic anhydride vinyl acetate copolymer was formed. Subsequent to the 3 hour reaction period, 20 grams of a polyethylene glycol diamine having a molecular weight of 2,000 and dissolved in 50 grams of benzene was added to the reaction vessel containing the produced copolymer product. This new reaction mixture was heated to 70° C. for a period of 4 hours. The resulting product was the thickening agent of this invention.

EXAMPLE VI

Ninety-eight grams of maleic anhydride and 89 grams of vinyl acetate were added to a reaction vessel. Five hundred grams of benzene (solvent) was then added to this combination. A benzoyl peroxide catalyst in amounts of 0.8 gram was then added to the reaction system. The reaction system was then subjected to a temperature of 70±2° C. for a 3 hour period. The maleic anhydride vinyl acetate copolymer was formed. Subsequent to the 3 hour reaction period, 50 grams of methoxy polyethylene glycol having a molecular weight of 750 and dissolved in 50 grams of benzene was added to the reaction vessel containing the produced copolymer product. This new reaction mixture was heated to 70° C. for a period of 4 hours. The resulting product was the thickening agent of this invention.

The final product was then dried to form a powder.

EVALUATION OF THE INVENTION

To demonstrate the effectiveness of the invention the thickening agent composition of this invention was compared with other thickening agent compositions.

Four identical compositions comprising 200 grams (wet weight) carboxylated SBR latex (styrene-budadiene rubber), 300 grams of calcium carbonate ($CaCO_3$), and 70 grams of water were added to 4 beakers identified as A, B, C and D respectively. Different commercially available thickening agents were added to these 4 beakers. In each case the amount of thickening agent added was one gram. Two of the thickening agents added represented compositions taught by this invention. After the addition of the thickening agent, viscosity measurements of the resulting mixtures were determined at various r.p.m.'s with a Brookfield viscometer using a No. 4 spindle. The results are given below in Table I.

TABLE I

| Run | Thickening agent, MW ≥1,000,000 | R.p.m. | Viscosity (cps.) |
|---|---|---|---|
| A | Polyacrylate | 60 | 1,750 |
|   |   | 30 | 2,700 |
|   |   | 12 | 5,500 |
|   |   | 6 | 8,700 |
|   |   | 3 | 14,000 |
| B | Polyacrylate/polyamide | 60 | 2,450 |
|   |   | 30 | 4,000 |
|   |   | 12 | 7,750 |
|   |   | 6 | 13,000 |
|   |   | 3 | 22,000 |
| C | Maleic anhydride/methyl vinyl ether/ polyethylene glycol. | 60 | 5,250 |
|   |   | 30 | 8,900 |
|   |   | 12 | 16,000 |
|   |   | 6 | 22,500 |
|   |   | 3 | 31,000 |
| D | Maleic anhydride/vinyl acetate/polyethylene glycol. | 60 | 6,800 |
|   |   | 30 | 10,000 |
|   |   | 12 | 17,500 |
|   |   | 6 | 27,000 |
|   |   | 3 | 43,000 |

In view of Table I it is obvious that the thickening agents taught by this composition yields superior results in regard to increasing the viscosity of the latex system.

CONCLUSION

This invention teaches a new latex thickening agent composition. Through its use it is possible to more efficiently increase viscosity of latex systems.

Having described my invention I hereby claim:

1. A rubber latex composition comprising:
   (A) a colloidal aqueous emulsion of a polymer, and
   (B) 0.1–5% by weight, based on rubber, of a water-soluble thickening agent prepared by reacting:
      (1) a maleic anhydride copolymer product having a molecular weight in the range of 10,000 to 80,000 produced through the about equimolar reaction of a maleic anhydride compound and vinyl acetate; with
      (2) a polyalkylene glycol from the group consisting of an ethylene glycol or a propylene glycol, said polyalkylene glycol having a molecular weight within the range of from 200 to 50,000.

2. The composition of claim 1 where the polyalkylene glycol is a polyethylene glycol.

3. The composition of claim 1 where the concentration of thickening agent is 0.25–2.5% by weight based on rubber.

References Cited

UNITED STATES PATENTS

| | | | |
|---|---|---|---|
| 2,988,539 | 6/1961 | Cohen et al. | 260—78 |
| 3,035,004 | 5/1962 | Glavis | 260—29.7 |
| 3,085,986 | 4/1963 | Muskat | 260—31.8 |
| 3,165,486 | 1/1965 | Johnson | 260—29.7 |
| 3,002,940 | 10/1961 | Holloway | 260—874 |
| 3,387,061 | 6/1968 | Smith et al. | 260—874 |

MORRIS LIEBMAN, Primary Examiner

T. DE BENEDICTIS, Sr., Assistant Examiner

U.S. Cl. X.R.

260—29.7 R, 29.7 H, 75 A, 78.5 BB, 78.5 T, 83.5, 86.7, 823, 874

UNITED STATES PATENT OFFICE
CERTIFICATE OF CORRECTION

Patent No. 3,660,339   Dated 5-2-72

Inventor(s) Theodore R. Schuh, Jr.

It is certified that error appears in the above-identified patent and that said Letters Patent are hereby corrected as shown below:

Column 7, line 19, before "rubber" insert -- dry --.

Signed and sealed this 26th day of September 1972.

(SEAL)
Attest:

EDWARD M. FLETCHER, JR.  ROBERT GOTTSCHALK
Attesting Officer        Commissioner of Patents